(12) United States Patent
Soga et al.

(10) Patent No.: US 10,564,295 B2
(45) Date of Patent: Feb. 18, 2020

(54) GLOBAL NAVIGATION SATELLITE SYSTEM, POSITIONING TERMINAL, POSITIONING METHOD, AND RECORDING MEDIUM

(71) Applicant: NEC Corporation, Minato-ku, Tokyo (JP)

(72) Inventors: Hiroshi Soga, Tokyo (JP); Yoshimi Ohshima, Tokyo (JP); Tomoya Osawa, Kanagawa (JP); Aki Taniyama, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 828 days.

(21) Appl. No.: 15/106,414

(22) PCT Filed: Dec. 24, 2014

(86) PCT No.: PCT/JP2014/084747
§ 371 (c)(1),
(2) Date: Jun. 20, 2016

(87) PCT Pub. No.: WO2015/099194
PCT Pub. Date: Jul. 2, 2015

(65) Prior Publication Data
US 2017/0038475 A1    Feb. 9, 2017

(30) Foreign Application Priority Data

Dec. 27, 2013  (JP) ................................. 2013-271986

(51) Int. Cl.
*G01S 19/44* (2010.01)
*G01S 19/06* (2010.01)
*G01S 19/25* (2010.01)

(52) U.S. Cl.
CPC .............. *G01S 19/44* (2013.01); *G01S 19/06* (2013.01); *G01S 19/25* (2013.01)

(58) Field of Classification Search
None
See application file for complete search history.

(56) References Cited

U.S. PATENT DOCUMENTS

| 2003/0157886 A1 | 8/2003 | Matsushita et al. |
| 2006/0152407 A1 | 7/2006 | Hatch |
| 2007/0205941 A1 | 9/2007 | Riley et al. |
| 2008/0165053 A1 | 7/2008 | Liu et al. |

(Continued)

FOREIGN PATENT DOCUMENTS

| CN | 101408607 A | 4/2009 |
| CN | 102124371 A | 7/2011 |

(Continued)

OTHER PUBLICATIONS

Chinese Office Action for CN Application No. 201480071279.0 dated May 2, 2017 with English Translation.

(Continued)

*Primary Examiner* — Whitney Moore

(57) ABSTRACT

Provided is a positioning terminal of a global navigation satellite system configured to: receive a plurality of navigation signals and an augmentation signal from a plurality of navigation satellites and an augmentation satellite; acquire, in a process of causing each value of error causes including an ambiguity to converge through a plurality of times of observation to enhance an accuracy of positioning through continuous observation, each value of a position of the positioning terminal recorded in advance in a storage area to calculate each value of the error cause, and use the calculated each value as an initial value and/or one value to be added for the continuous observation to cause each value of the error cause to converge; and successively perform positioning calculation.

10 Claims, 7 Drawing Sheets

(56) References Cited

U.S. PATENT DOCUMENTS

| | | |
|---|---|---|
| 2008/0198068 A1 | 8/2008 | Kurata |
| 2010/0188285 A1 | 7/2010 | Collins |
| 2011/0187590 A1 | 8/2011 | Leandro |
| 2011/0248885 A1 | 10/2011 | Aoki |
| 2011/0267226 A1 | 11/2011 | Talbot et al. |
| 2012/0040693 A1 | 2/2012 | Wigren et al. |
| 2012/0116677 A1 | 5/2012 | Higgison |
| 2012/0146847 A1* | 6/2012 | Janky ............ G01S 19/07 342/357.23 |
| 2012/0286991 A1 | 11/2012 | Chen et al. |

FOREIGN PATENT DOCUMENTS

| | | |
|---|---|---|
| CN | 102235863 A | 11/2011 |
| CN | 102272619 A | 12/2011 |
| CN | 102834732 A | 12/2012 |
| JP | 2001-133536 A | 5/2001 |
| JP | 2001-133537 A | 5/2001 |
| JP | 2003-316665 A | 11/2003 |
| JP | 3508655 B2 | 3/2004 |
| JP | 2005-004789 A | 1/2005 |
| JP | 2005-274521 A | 10/2005 |
| JP | 2006-071460 A | 3/2006 |
| JP | 2007-248271 A | 9/2007 |
| JP | 2008-064555 A | 3/2008 |
| JP | 2008-145363 A | 6/2008 |
| JP | 2008-224657 A | 9/2008 |
| JP | 2009-074930 A | 4/2009 |
| JP | 2009-525491 A | 7/2009 |
| JP | 2009-529677 A | 8/2009 |
| JP | 2010-071686 A | 4/2010 |
| JP | 2011-220793 A | 11/2011 |
| JP | 2011-237333 A | 11/2011 |
| JP | 2012-507700 A | 3/2012 |
| JP | 2012-073082 A | 4/2012 |
| JP | 2012-073083 A | 4/2012 |
| JP | 2012-524259 A | 10/2012 |
| WO | 2012/082996 A1 | 6/2012 |
| WO | 2012/097022 A1 | 7/2012 |

OTHER PUBLICATIONS

Japanese Office Action for JP Application No. 2013-271986 dated Nov. 12, 2014 with English Translation.

Japanese Office Action for JP Application No. 2013-271986 dated Jul. 15, 2015 with English Translation.

Xing-Wei Gao et al., "WAAS Tropospheric Delay Model and Its Application in Network RTK", 21994-2016 China Academic Journal Electronic Publishing House, Science of Surveying and Mapping, vol. 36, No. 3., May 2011.

Chinese Office Action for CN Application No. 201480071279.0 dated Jan. 17, 2018 with English Translation.

International Search Report for PCT Application No. PCT/JP2014/084747, dated Mar. 24, 2015.

English translation of Written opinion for PCT Application No. PCT/JP2014/084747.

Communication dated Feb. 5, 2019, from the European Patent Office in counterpart European Application No. 14873555.8.

Li, et al., "Regional reference network augmented precise point positioning for instantaneous ambiguity resolution", Journal of Geodesy; Continuation of Bulletin Géodésique and Manuscripta Geodaetica, Springer, Berlin, DE, Nov. 23, 2010, vol. 85, No. 3, pp. 151-158, XP019883602 (8 pages total).

Byun, et al., "A new type of troposphere zenith path delay product of the international GNSS service", Journal of Geodesy; Continuation of Bulletin Géodésique and Manuscripta Geodaetica, Springer, Berlin, DE, Sep. 11, 2009, vol. 83, No. 3-4, pp. 367-373, XP019756068 (7 pages total).

P. Collins, "Isolating and Estimating Undifferenced GPS Integer Ambiguities", NTM 2008—Proceedings of the 2008 National Technical Meeting of the Institute of Navigation, Jan. 30, 2008, p. 720-732 VA, USA.

A. Jokinen et al., "Fixed Ambiguity Precise Point Positioning (PPP) Using Tropospheric Corrections Based on Numeric Weather Modeling (NWM)", PNT 2013—Proceedings of the ION 2013 Pacific PNT Meeting, The Institute of Navigation, Apr. 25, 2013, pp. 319-329, VA, USA.

Masayuki Saito et al., "Centimeter-class Augmentation System Utilizing Quasi-Zenith Satellite", GNSS 2011—Proceedings of the 24th International Technical Meeting of the Satellite Division of the Institute of Navigation (ION GNSS 2011), Sep. 23, 2011, p. 1243-1253, VA, USA.

Extended European Search Report for EP Application No. EP14873555.8 dated Oct. 26, 2017.

\* cited by examiner

GLOBAL NAVIGATION SATELLITE SYSTEM, POSITIONING TERMINAL, POSITIONING METHOD, AND RECORDING MEDIUM

This application is a National Stage Entry of PCT/JP2014/084747 filed on Dec. 24, 2014, which claims priority from Japanese Patent Application 2013-271986 filed on Dec. 27, 2013, the contents of all of which are incorporated herein by reference, in their entirety.

TECHNICAL FIELD

This invention relates to a global navigation satellite system, a positioning terminal, a positioning method, and a recording medium, which are capable of accurately performing positioning of an arbitrary location through use of a signal wave received from an artificial satellite or the like.

BACKGROUND ART

In recent years, positioning of position coordinates of many locations uses a global navigation satellite system (global navigation satellite system).

In the Global Positioning System (GPS), which is a representative global navigation satellite system, position coordinates of a GPS receiver (positioning terminal) can be determined through use of a plurality of GPS signal waves transmitted from a plurality of GPS satellites (NAVSTARs).

With a positioning method using the GPS signals, as a result of various researches and developments, a current position (position of positioning terminal) can now be determined by the terminal alone almost in real time with an accuracy of about 10 m. This real-time positioning uses a broadcast ephemeris superimposed on the GPS signal.

Further, as a positioning method for enhancing a positioning accuracy, there are a positioning method using a precise ephemeris and a positioning method involving causing a plurality of terminals to operate in cooperation with one another. The precise ephemeris is obtained by, for example, the International GNSS Service (IGS) by calculating a precise route of a satellite orbit. Through use of this precise ephemeris indicating the precise route in combination with other methods, a positioning terminal, although not being able to perform the real-time positioning, can enhance its positioning accuracy to about 10 cm.

Technologies, which are related to the broadcast ephemeris and the precise ephemeris, are disclosed in, for example, Patent Documents 1 to 3.

In Patent Document 1, there is disclosed a GPS positioning system configured to perform high-accuracy positioning through use of the final ephemeris controlled by the IGS. Further, in Patent Document 1, there are descriptions of a rapid ephemeris and the final ephemeris.

In Patent Document 2, there is disclosed a GPS positioning system configured to perform high-accuracy positioning through use of the final ephemeris controlled by the IGS. In this system, as long as data is collected at the same location for about 24 hours for positioning, a positioning accuracy in the order of centimeters is obtained.

In Patent Document 3, there is disclosed a global navigation satellite system capable of reducing, when a positioning terminal executes positioning that is based on a plurality of navigation signals, a period of time required for processing to be performed prior to the start of calculation of generating pseudoranges to respective satellites (calculation processing of causing various numerical values to converge). In the method disclosed in this document, a signal propagation time of an arbitrary satellite that can be determined first is used for calculation of a signal propagation time of another satellite.

PRIOR ART DOCUMENTS

Patent Document

Patent Document 1: JP-B-3508655
Patent Document 2: JP-A-2001-133536
Patent Document 3: JP-A-2011-237333

SUMMARY OF THE INVENTION

Problem to be Solved by the Invention

Enhancement of a positioning accuracy and reduction of a time period required until positioning is completed are universal challenges in the positioning system.

A positioning terminal can use the precise ephemeris (final ephemeris) in order to enhance its positioning accuracy. However, the positioning terminal cannot acquire the precise ephemeris immediately. This is because the precise ephemeris is obtained by calculating an accurate satellite orbit after navigation signals output from each satellite are received and accumulated in various parts of the world.

Meanwhile, a scheme for a positioning system capable of acquiring the precise ephemeris estimated based on past data from a communication network or a quasi-zenith satellite almost in real time is being put into place. Through use of this (estimated) precise ephemeris, the positioning terminal can enhance its positioning accuracy.

The precise ephemeris estimated in this manner is broadcast as an augmentation signal (correction information) that uses a quasi-zenith satellite or a stationary satellite toward positioning terminals (e.g., toward vehicles, mobile phones, GPS devices, ships, agricultural machines, or mining machines) from now on. This allows various types of positioning terminals to perform high-accuracy positioning, with the result that better services can be realized.

The quasi-zenith satellite secures a higher elevation angle than that of the stationary satellite at any time. Therefore, through use of the quasi-zenith satellite as a source for acquiring the augmentation signal, the positioning terminal can receive augmentation information more accurately without the augmentation signal being affected by an object that blocks signals, such as a building. The augmentation information includes correction information on a group of satellites forming an existing positioning system, acquisition-aiding information, integrity information, the precise ephemeris, and others.

The augmentation signals that can be used in the Japan and Oceania regions include L1-SAIF signals or LEX signals, which are currently broadcast by quasi-zenith satellites. The augmentation signal of those kinds includes the precise ephemeris, the correction information, the acquisition-aiding information, the integrity information, and others.

In order to realize accurate positioning that is based on the positioning system, many researchers have made efforts to cancel (eliminate, decrease, reduce, or lower) various error causes individually. Examples of various error causes include an ionospheric propagation delay, a tropospheric propagation delay, an ambiguity, and a multipath propagation.

The positioning terminal may obtain and use correction information to solve some of the error causes. Meanwhile, correction information for finding out a value of every error cause is not provided under current circumstances. Moreover, the error causes relating to the ambiguity and the multipath propagation differ for each positioning terminal. Accordingly, for part of the error causes, such as the ambiguity and the multipath propagation, correction information is not provided. The correction information is used in many precise point positioning (PPP) methods. Many researchers have sought various methods for performing accurate positioning with the positioning terminal alone.

The inventors of this invention do not know a method of removing effective error causes relating to some error causes in real time (with immediacy).

In the precise point positioning, under current circumstances, estimated values of the ambiguity, the tropospheric propagation delay, and a clock difference between a positioning terminal and satellite system time are caused to converge through accumulation of a plurality of times of observation of navigation signals transmitted from satellites. A method of determining a true value of the ambiguity is called "ambiguity resolution (AR)", and many methods for the AR are now being investigated.

A time period that is different for each of the values is required until the value converges, and when the GPS satellite is used in a method using the precise ephemeris and a carrier-phase measurement value, the values can converge in about the following time periods, respectively.

ambiguity: about 30 minutes (1,800 seconds)
tropospheric propagation delay: about 10 minutes (600 seconds)
clock difference between positioning terminal and satellite system time: a few seconds at the minimum The accuracy of each value is enhanced successively through accumulation of a plurality of times of observation. Meanwhile, there is a problem in that it takes time to acquire a satisfactory accuracy. For example, in order to require a given positioning terminal to have a positioning accuracy in the order of centimeters through the precise point positioning, a time period for convergence of a value such as the ambiguity is necessary. Under current circumstances, this time period is about 30 minutes after the start of observation.

In order to further enhance the immediacy, a method of causing each of the values to converge more quickly with a positioning terminal is expected to appear. With the appearance of this method, for example, a positioning terminal capable of performing point positioning that is highly accurate in real time can be realized.

This invention provides a global navigation satellite system, a positioning terminal, a positioning method, and a program, which are capable of acquiring a high positioning accuracy in a shorter time period than an existing global navigation satellite system having an equivalent accuracy by adopting a new approach.

Means to Solve the Problem

According to one embodiment of this invention, there is provided a global navigation satellite system (GNSS), including: a plurality of navigation satellites configured to broadcast a navigation signal for the GNSS; an augmentation satellite configured to broadcast an augmentation signal on which a precise ephemeris and correction information relating to each of the plurality of navigation satellites are superimposed; and one or more positioning terminals configured to perform positioning, in which each of the one or more positioning terminals is configured to: receive a plurality of the navigation signals and the augmentation signal from the plurality of navigation satellites and the augmentation satellite, respectively; acquire, in a process of causing each value of error causes including an ambiguity to converge through a plurality of times of observation to enhance an accuracy of positioning that is based on the plurality of the navigation signals through continuous observation, for one or more error causes exhibiting a value that is different for each of the one or more positioning terminals, each value of a position of the each of the one or more positioning terminals recorded in advance in a storage area to calculate each value of the one or more error causes, and use the calculated each value as an initial value and/or one value to be added for the continuous observation to cause each value of the one or more error causes to converge; and successively perform positioning calculations reflecting at least part of the correction information, the precise ephemeris, and each value of the one or more error causes.

According to one embodiment of this invention, there is provided a positioning terminal, including: a broadcast wave signal processing unit configured to receive at least a plurality of navigation signals to output ranging observation data; a correction unit configured to, in a process of causing each value of error causes to converge through continuous observation including a plurality of times of observation as part of correction for enhancing an accuracy of positioning, acquire each value of a position of the positioning terminal recorded in advance in a storage area to calculate each value of the error cause, use the calculated each value as an initial value and/or one value to be added for the continuous observation and then determine each value of the error cause to be used for correction, and execute the correction of the ranging observation data; and a positioning calculation unit configured to perform positioning calculation by canceling an error component based on the ranging observation data corrected by the correction unit to calculate the position of the positioning terminal having the error components canceled.

According to one embodiment of this invention, there is provided a positioning method to be performed by a positioning terminal of a global navigation satellite system, including: acquiring, by the positioning terminal, from a plurality of navigation satellites for the GNSS and an information source configured to output a precise ephemeris and correction information, a plurality of navigation signals, the precise ephemeris, and the correction information; acquiring, by the positioning terminal, in a process of causing each value of error causes including an ambiguity to converge through a plurality of times of continuous observation to enhance an accuracy of positioning that is based on the plurality of navigation signals through continuous observation, each value of a position of the positioning terminal recorded in advance in a storage area to calculate each value of the error cause; using, by the positioning terminal, the calculated each value as an initial value and/or one value to be added for the continuous observation to cause each value of the error cause to converge; and performing, by the positioning terminal, positioning calculations reflecting at least part of the correction information, the precise ephemeris, and each value of the error cause.

According to one embodiment of this invention, there is provided a program for causing a processor included in a positioning terminal to operate so as to: acquire, in a process of causing each value of error causes including an ambiguity to converge through a plurality of times of continuous observation to enhance an accuracy of positioning that is based on a plurality of navigation signals through continuous observation, each value of a position of the positioning terminal recorded in advance in a storage area to calculate each value of the error cause; and use the calculated each value as an initial value and/or one value to be added for the continuous observation to cause each value of the error cause to converge.

According to one embodiment of this invention, there is provided a recording medium having a program non-transitorily recorded thereon, the program causing a processor included in a positioning terminal to operate so as to: acquire, in a process of causing each value of error causes including an ambiguity to converge through a plurality of times of continuous observation to enhance an accuracy of positioning that is based on a plurality of navigation signals through continuous observation, each value of a position of the positioning terminal recorded in advance in a storage area to calculate each value of the error cause; and use the calculated each value as an initial value and/or one value to be added for the continuous observation to cause each value of the error cause to converge.

Effect of the Invention

According to this invention, there can be provided the global navigation satellite system, the positioning terminal, the positioning method, and the recording medium, which are capable of acquiring a high positioning accuracy in a shorter time period than an existing global navigation satellite system having an equivalent accuracy.

MODES FOR EMBODYING THE INVENTION

Figure 1:
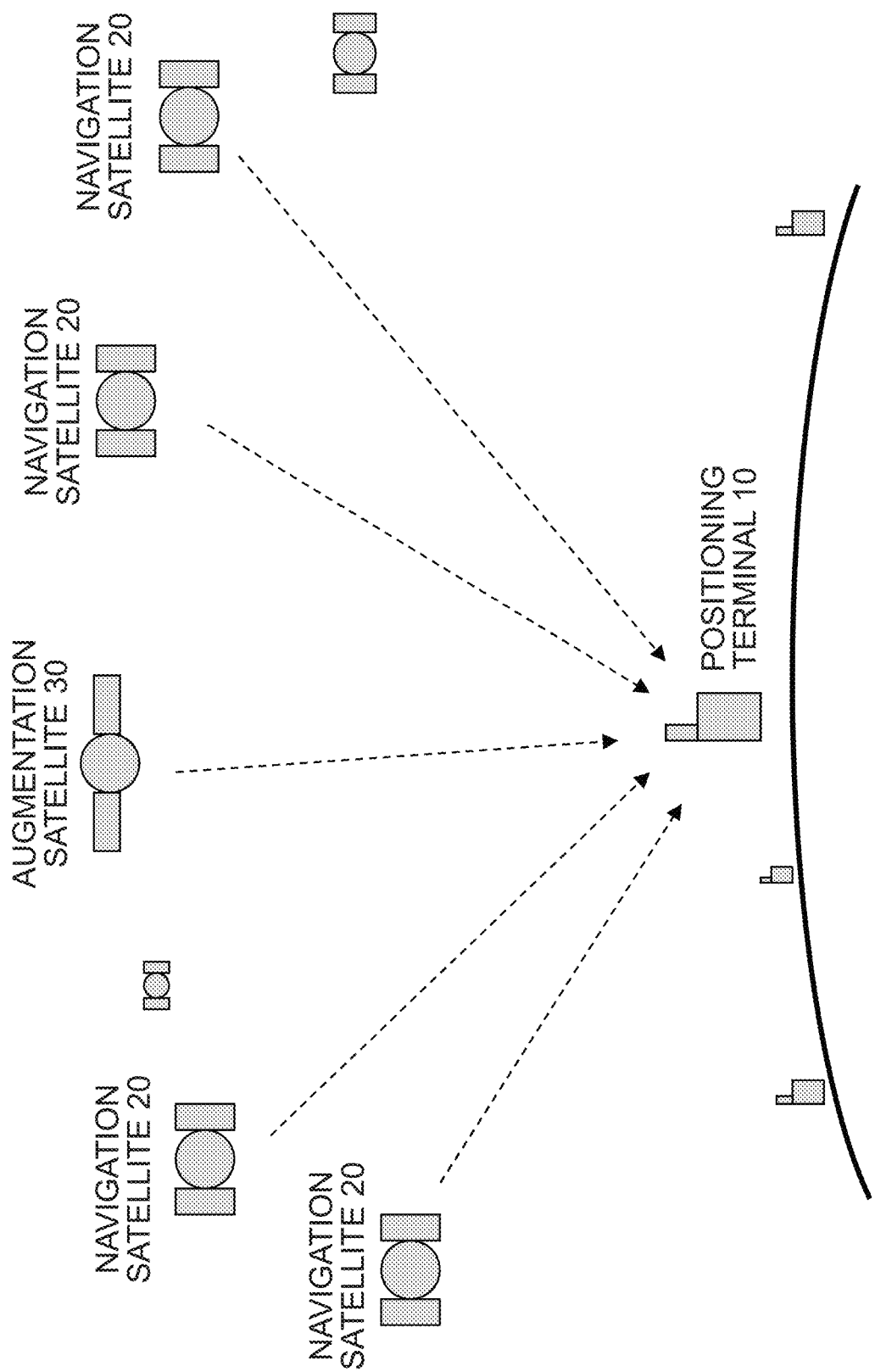
FIG. 1 is a configuration diagram for illustrating a global navigation satellite system according to an embodiment of this invention.

Now, embodiments of this invention are described with reference to the drawings.

First Embodiment

An embodiment of this invention is described with reference to FIG. 1 to FIG. 7.

First, theoretical expressions for a positioning method using a navigation satellite to be used in the following description are briefly described. The following description is not intended to limit the positioning method and the like. In the following, in order to describe obstacles to immediacy, a specific positioning method is described as an example.

The following logical expressions include Observation Equation (1) using a single frequency Li and using only a code pseudorange measurement value, Observation Equation (2) using the code pseudorange measurement value and a carrier-phase measurement value in combination, and General Expression (3) for calculating a distance to be used in common.

$$P_{Li} = \rho + C(\delta t_u - \delta t_s) + I_{Li} + T + \varepsilon_{PLi} \tag{1}$$

$$\Phi_{Li} = \rho + C(\delta t_u - \delta t_s) - I_{Li} + T + W_{Li} + N_{Li}\lambda_{Li} + \varepsilon_{\Phi Li} \tag{2}$$

$$\rho = \sqrt{(x_s - x_u)^2 + (y_s - y_u)^2 + (z_s - z_u)^2} + R \tag{3}$$

In Expression (1), a pseudorange is calculated. In Expression (2), a carrier-phase range is calculated. In positioning calculation, unknown values such as a position of a positioning terminal can be solved by using observation equations of a plurality of satellites in combination.

The variables are as follows.

$P_{Li}$: pseudorange
$\Phi_{Li}$: carrier-phase range
$\rho$: geometric distance between satellite antenna phase center position and positioning terminal antenna phase center position
$C$: light speed (299,792,458.0 m/s)
$\delta t_u$: clock difference between positioning terminal and navigation satellite system time (*)
$\delta t_s$: clock difference between navigation satellite and navigation satellite system time
$I_{Li}$: ionospheric propagation delay
$T$: tropospheric propagation delay (*)
$W_{Li}$: phase windup effect
$N_{Li}$: ambiguity (*)
$\lambda_{Li}$: wavelength
$\varepsilon_{pLi}$: pseudorange observation noise containing multipath propagation
$\varepsilon_{\Phi Li}$: carrier-phase range observation noise containing multipath propagation
$x_s, y_s, z_s$: satellite antenna phase center position
$x_u, y_u, z_u$: positioning terminal antenna phase center position
$R$: Sagnac effect Similarly, the logical expressions also include Method (4) using only a code pseudorange measurement value obtained by removing an influence of the ionospheric propagation delay through use of two frequencies and Method (5) using the code pseudorange measurement value and the carrier-phase measurement value in combination.

In Expression (4), the pseudorange is calculated. In Expression (5), the carrier-phase range is calculated. Expression (3) is used to calculate $\rho$.

$$P_{IF} = \rho + C(\delta t_u - \delta t_s) + T + \varepsilon_{PIF} \tag{4}$$

$$\Phi_{IF} = \rho + C(\delta t_u - \delta t_s) + T + W_{IF} + N_{IF}\lambda_{IF}\varepsilon_{\Phi IF} \tag{5}$$

The variables are as follows. Part of variables already described is omitted.

$P_{IF}$: pseudorange
$\Phi_{IF}$: carrier-phase range
$\delta t_u$: clock difference between positioning terminal and GPS satellite system time (*)

$\delta_{ts}$: clock difference between navigation satellite and navigation satellite system time T: tropospheric propagation delay (*)

$W_{IF}$: phase windup effect $N_{IF}$: ambiguity (*)

$\lambda_{IF}$: wavelength $\varepsilon_{PIF}$: pseudorange observation noise containing multipath propagation $\varepsilon_{\Phi IF}$: carrier-phase range observation noise containing multipath propagation In the description of the variables of the logical expressions given above, the variables marked with the asterisk (*) are obtained by causing their estimated values to converge through accumulation of a plurality of times of observation of broadcast waves transmitted from the navigation satellite on the positioning terminal side.

The most suitable values of the variables that can be acquired are assigned to the logical expressions appropriately, to thereby be able to acquire more suitable positioning accuracy.

A positioning terminal receives a plurality of navigation signals from a plurality of navigation satellites, and continues the positioning that uses the precise ephemeris and the correction information acquired from the augmentation satellite and others, to thereby be able to execute positioning that is more satisfactorily accurate due to the convergence of each value of the error cause. Even with positioning that does not use part or all of the correction information, the positioning terminal can perform positioning that is satisfactorily accurate because each value of the error cause converges through the continuous observation.

In contrast, as described above, with existing methods, final high-accuracy positioning can be realized only in a stepwise manner until a certain period for convergence elapses. In order for the positioning terminal to obtain the positioning accuracy in the order of a few centimeters through the precise point positioning after waiting for the value of the ambiguity to converge along with other suitable correction methods, as described above, a period of about 30 minutes is required until the value of the ambiguity converges under current circumstances.

In addition, in processing performed by the positioning terminal to cause the value of the ambiguity to converge, when the continuous observation is interrupted, estimation needs to be performed again. This is because when the continuous observation is interrupted, values of the ambiguity after the interruption are discontinuous from the previous values. Considering this fact taking a mobile terminal as an example, positioning needs to be continued at any time, and thus there arises a problem such as increase in power consumption. Moreover, in urban areas or other such areas, it is likely that a mobile terminal may move to an area where observation cannot be performed and then the observation is interrupted. In the case of an in-vehicle device, when observation is interrupted while a vehicle is moving and passing underneath elevated railway tracks, behind a building, or the like, estimation needs to be performed again from the beginning. In short, there are many restrictions in practice to complete the processing of causing the value of the ambiguity to converge under a real environment. Meanwhile, if a user is required to be subjected to restrictions, modes for an actual operation are significantly limited.

Now, in view of the above-mentioned circumstances, the embodiment of this invention is described.

FIG. 1 is a configuration diagram for illustrating a global navigation satellite system according to the embodiment.

The global navigation satellite system includes a positioning terminal 10 configured to perform positioning, a plurality of navigation satellites 20 configured to broadcast navigation signals for the GNSS, and an augmentation satellite 30 configured to broadcast precise ephemerides and correction information relating to the individual navigation satellites after superimposing this information on an augmentation signal.

Each of the navigation satellites 20 is configured to broadcast multi-frequency navigation signals. As the navigation satellite 20, for example, a commonly-used GPS satellite can be used.

The augmentation satellite 30 is configured to broadcast the correction information including the precise ephemeris itself or information that can be treated as a precise ephemeris after times and orbits of the individual satellites included therein are corrected (hereinafter referred to as "precise ephemeris" in consideration of this information) after superimposing the correction information on the augmentation signal. Further, the augmentation satellite 30 is configured to also broadcast correction information including error information indicating an ionospheric propagation delay and a tropospheric propagation delay of a region subjected to positioning and others after superimposing the correction information on the augmentation signal.

Further, the augmentation satellite 30 itself may also be used as one navigation satellite. A description of a facility for supporting the augmentation satellite 30 and the like is omitted.

In the following description, the precise ephemeris is acquired from the augmentation satellite 30, but the precise ephemeris may be acquired via a communication network (e.g., a mobile communication network, a wireless-local area network (wireless LAN), or Bluetooth). Further, even when the positioning terminal 10 does not use the precise ephemeris, by reducing an error component through use of a value, such as the ambiguity, caused to converge by the positioning terminal 10 quickly, the positioning terminal 10 can enhance its immediacy and accuracy of positioning.

The augmentation satellite 30 is not limited to a quasi-zenith satellite. Further, the correction information included in the augmentation signal may be used as needed for suitable purposes.

The positioning terminal 10 is configured to receive, for positioning, the navigation signals from the respective navigation satellite 20. The positioning processing is performed through use of a group of four or more navigation signals.

Further, the positioning terminal 10 is configured to receive the augmentation signal from the augmentation satellite 30 to acquire from the precise ephemeris the time and orbit of the navigation satellite to be used, the error information indicating the ionospheric propagation delay and the tropospheric propagation delay of the region subjected to positioning, and others.

Further, the positioning terminal 10 may be configured to receive, from all of the navigation satellites 20 to be used, two-frequency/three-frequency broadcast waves to remove an ionospheric propagation delay component without using the correction information (ionospheric correction information) of the received augmentation signal.

A general positioning terminal can perform positioning through use of only a group of navigation signals of different satellites that have been received for the positioning. Meanwhile, with the positioning that uses only the group of navigation signals, there are problems in that an accuracy is low and a time period required for the positioning is long.

In view of this, when enhancing the accuracy of positioning that is based on a plurality of navigation signals, the positioning terminal 10 uses the correction information and the precise ephemeris to correct each value to be used for positioning calculation. The positioning terminal 10 then performs the positioning calculation that is based on the corrected distances to the respective navigation satellites 20 to output the position of the terminal and the current time.

Further, the positioning terminal 10 executes calculation processing of causing each value of the error cause to converge through continuous observation while repeating the above-mentioned processing in a stepwise manner.

At this time, the positioning terminal 10 holds in a storage area the value of the position of the terminal, which is estimated or determined from a known parameter that is not based on the navigation signal, and uses this held value as an initial value or one value to be added when causing each value of the error cause to converge through the continuous observation.

In this method, as the value to be held in the storage area, a value calculated by the terminal itself may be recorded, or a value acquired from another information source may be recorded. As another example, a value obtained through estimation processing by using the value acquired from another information source may be recorded. For example, the positioning terminal 10 can use position coordinates obtained in the past through GPS positioning as the position of the terminal, position coordinates calculated by causing a plurality of positioning terminals to operate in cooperation with one another in real time, position coordinates of the terminal notified from another device via communication means, or position coordinates input from a user.

A device serving as the information source may notify the terminal of a value of the terminal position of a notification destination in the form of x, y, and z coordinates, or in the form of relative coordinates from a reference device. The value of the terminal position can have any format as long as the positioning terminal 10 can calculate x, y, and z coordinates through calculation or the like.

Through the execution of the above-mentioned processing, without waiting for a time period required for a value such as the ambiguity to converge, a value close to a true value of the ambiguity or the like can be input as the initial value or as a sample value at an initial stage. As a result, with this method, without the need to wait for accumulation of the sample values through the continuous observation, a satisfactory value close to a true value of the ambiguity or the like can be quickly determined (estimated). In short, the time period required for the value to converge can be shortened. Further, as compared to a processing method of causing each value of the error cause to converge through existing continuous observation, the positioning terminal 10 can shorten a time period required until positioning with an equivalent accuracy can be realized.

Further, simultaneously with this processing relating to the determination of the ambiguity, the positioning terminal 10 receives a value of the tropospheric propagation delay amount that has been measured within a predetermined time period and within an area close to the position of the terminal as external information from another device and stores this external information in the storage area, and uses the value of the tropospheric propagation delay amount as the initial value or one sample value to be added for the continuous observation. At this time, a condition that a change in weather falls within a predetermined weather change level may be used as an exchange condition or additional condition for the value of the tropospheric propagation delay amount. The positioning terminal 10 may use a change in cloud amount, rainfall amount, or atmospheric pressure as the weather change level to make the determination on the basis of information acquired through the observation by the terminal or acquired from a system configured to distribute weather information.

After that, through use of, along with another method of removing the error cause, the value of the ambiguity determined successively and the received value of the tropospheric propagation delay amount, the positioning terminal 10 successively executes the positioning calculation to output the position of the terminal and the current time.

As described above, in the process of causing each value of the error cause to converge through the continuous observation as processing for enhancing the positioning accuracy, the positioning terminal 10 acquires a value desired to be used in the terminal from known parameters other than the received navigation signal to be used for the positioning calculation, and adopts each value as the initial value or one value to be added for the continuous observation.

With this configuration, the error cause, whose value has hitherto been lowered through the continuous observation, can be caused to converge more satisfactorily and quickly than in existing technologies.

As one method, when terminating the positioning, the positioning terminal 10 holds, as each value of the position of the terminal, the above-mentioned value of the position of the terminal that is estimated or determined from the known parameters that are not based on the navigation signal in a storage area of a storage unit, and then terminates the positioning. With this configuration, the value for the next measurement can be prepared for use in the storage area. For example, when terminating an application such as map software or terminating the positioning processing, the positioning terminal 10 may hold each value of the position of the terminal in the storage area.

Further, the positioning terminal 10 may identify, or be notified of, an amount of movement of the terminal, and may use a value obtained by adding the movement amount to the value of the position held in the storage area. For example, the positioning terminal 10 may calculate or acquire its movement amount for the previous position of the terminal, and use the resultant value as each value of the current position of the terminal. In order to calculate the movement amount or as the value to be acquired, coordinates, acceleration, and correct time of the terminal may be used in combination appropriately. The positioning terminal 10 may be notified of its movement by, for example, an in-vehicle device computer in the case of an in-vehicle device. As another example, short range communication or broadcasting may be used.

Further, the positioning terminal 10 may receive each value of the position of the terminal as the external information. For example, a sensor network device installed on the street measures an accurate position of the terminal in association with time, and notifies the positioning terminal 10 of a result of the measurement via the communication means or broadcast waves. The positioning terminal 10 receives information that allows identification of an accurate position where the terminal was located in the past and time corresponding to the past position, records the received information in the storage area, and uses the recorded information to cause the values of the ambiguity and others to converge.

Further, the positioning terminal 10 may use each value of the position of the terminal, which is acquired as the external information to be held in the storage area, and the value of the amount of movement of the terminal, which is identified or notified, to cause the value such as the ambiguity to converge.

As described above, the positioning terminal 10 uses the position coordinates acquired by the terminal in the past or the position coordinates acquired from another device as the initial value and/or one value to be added for the continuous observation.

Through execution of this processing, for example, the positioning terminal 10 can input a value close to a true value of the ambiguity as an initial value or a sample value at the initial stage. As a result, without the need to wait for accumulation of the sample values, the positioning terminal 10 can quickly determine, as the value of the ambiguity, a satisfactory value close to its true value. In short, this positioning method can achieve an effect of shortening a time period required with existing methods until the value of the ambiguity converges.

Next, an exemplary configuration of the positioning terminal 10 is described. Each unit of the positioning terminal 10 only needs to be realized by appropriately using hardware and software in combination.

Figure 2:
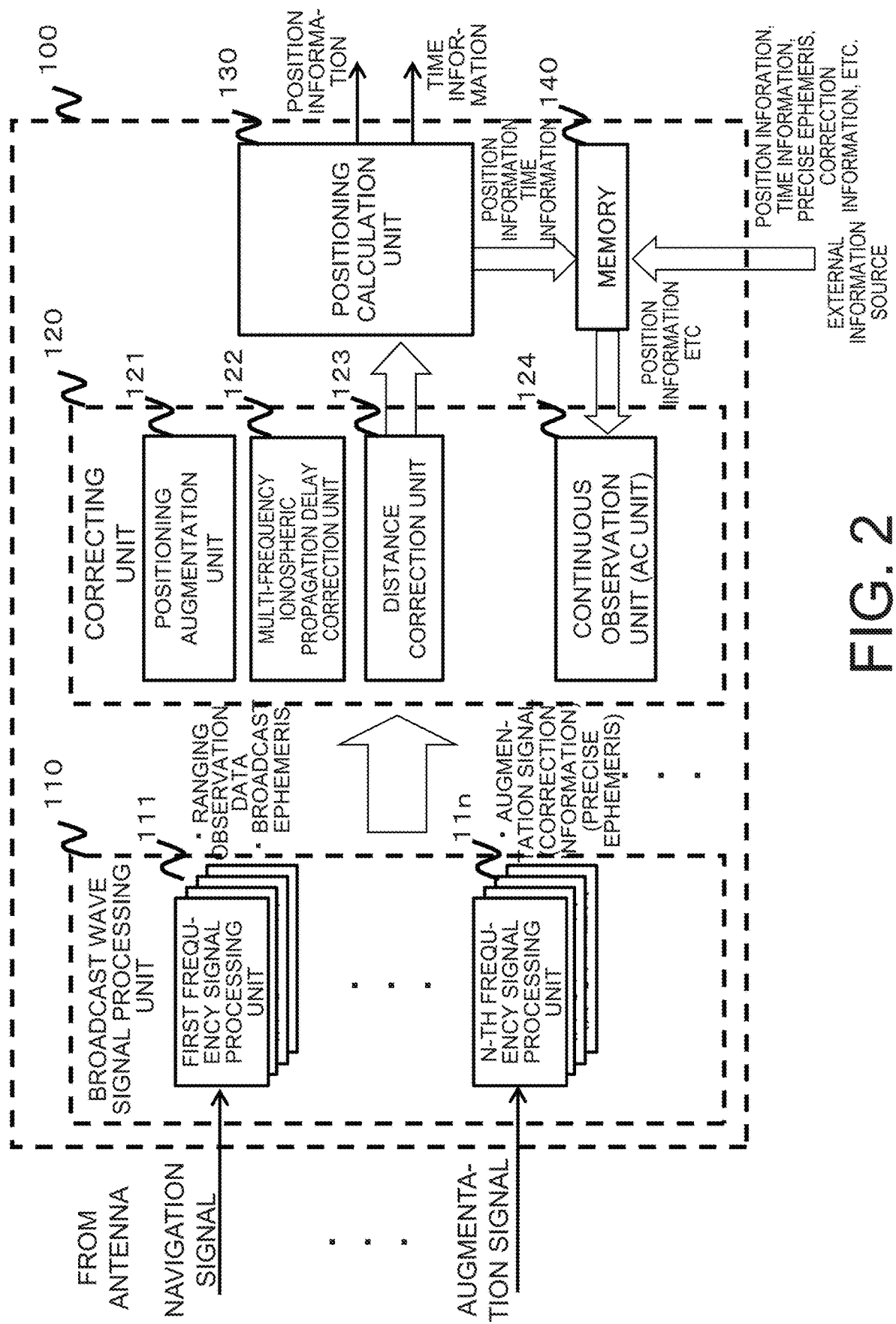
FIG. 2 is a block diagram for illustrating part of a positioning terminal according to the embodiment of this invention.

FIG. 2 is a block diagram for illustrating part of the positioning terminal 10.

The positioning terminal 10 according to this embodiment includes a positioning unit 100 illustrated in FIG. 2. The positioning terminal 10 also includes, in addition to the positioning unit 100 illustrated in FIG. 2, an antenna, an input unit, an output unit, a control unit configured to operate application software, and others.

The positioning unit 100 includes a broadcast wave signal processing unit 110, a correction unit 120, and a positioning calculation unit 130.

The broadcast wave signal processing unit 110 includes a first frequency signal processing unit 111 to an n-th frequency signal processing unit 11n (where n is an integer of 2 or larger). The broadcast wave signal processing unit 110 is configured to simultaneously receive multi-frequency signals for the GNSS from the plurality of navigation satellites 20 and the augmentation satellite 30 to acquire a plurality of navigation signals and the augmentation signal. In the case of simplifying the configuration of the positioning unit 100, the broadcast wave signal processing unit 110 may be configured to process only a single-frequency signal as long as the broadcast wave signal processing unit 110 can receive the navigation signals from at least four satellites. Further, the precise ephemeris and the correction information may be acquired from the communication means of the positioning terminal 10 or the like.

The correction unit 120 includes a positioning augmentation unit 121, a multi-frequency ionospheric propagation delay correction unit 122, and a distance correction unit 123. The correction unit 120 is configured to receive various kinds of information from the broadcast wave signal processing unit 110 and others, and to use the correction information and the precise ephemeris to perform correction processing of enhancing the accuracy of positioning that is based on the plurality of navigation signals. The correction unit 120 further includes a continuous observation unit 124 configured to successively determine each value of the error cause through continuous observation.

The positioning augmentation unit 121 is configured to identify the correction information that is included in the received augmentation signal and includes the time and orbit of each satellite, information on the ionosphere and the troposphere, and others, to generate each piece of correction information. Further, it is desired that the positioning augmentation unit 121 perform processing operation for securing soundness.

The multi-frequency ionospheric propagation delay correction unit 122 is configured to calculate the ionospheric delay component based on a difference in delay among the plurality of navigation signals transmitted from the respective navigation satellites 20 without using the information on the ionosphere, which is included in the augmentation signal, to thereby generate the correction information.

The distance correction unit 123 is configured to be capable of using the augmentation signal, the correction information, and the precise ephemeris to correct the distance of ranging observation data. Further, the distance correction unit 123 is configured to correct the distance through use of values of information for correction, which are output successively by the continuous observation unit 124 to be described below.

The continuous observation unit 124 is configured to, in the process of causing each value of the error cause to converge through the continuous observation, acquire from a memory 140 each value of the position of the terminal recorded in the memory 140, and adopt each value thus acquired as the initial value and/or one value to be added for the continuous observation. Further, the continuous observation unit 124 may be configured to acquire, from the storage area inside the terminal instead of from the memory 140, each value of the position of the terminal recorded in the storage area. Further, it is desired that the continuous observation unit 124 also acquire time at which the position information was acquired, which is read from the storage area.

Further, the continuous observation unit 124 is configured to, when the tropospheric propagation delay amount is recorded in the memory 140 (or the storage area inside the terminal), adopt this recorded value as the initial value and/or one value to be added for the continuous observation.

After that, the continuous observation unit 124 determines each value to be caused to converge through the continuous observation (ambiguity, tropospheric propagation delay, and clock difference between positioning terminal and navigation satellite system time) and successively notifies the distance correction unit 123 of the determined values.

Though this notification, the distance correction unit 123 can acquire the ranging observation data that allows acquisition of a more accurate positioning result.

In existing methods of determining the ambiguity, a true value of the ambiguity is estimated through long-time continuous observation.

In contrast, in deriving the ambiguity, the continuous observation unit 124 uses various parameters that are highly accurate to estimate (calculate) a theoretical value of the ambiguity. Next, the continuous observation unit 124 gives the theoretical value of the ambiguity to a Kalman filter to be used to estimate a true value as the initial value and/or one value to be added for the continuous observation.

Through this processing, the following effect can be expected: a value of a covariance during an initial period can be set small. As a result, a time period required until the ambiguity converges can be shortened by adopting this positioning method.

Similarly, in existing methods of determining the tropospheric propagation delay amount, an influence of the tropospheric propagation delay amount is estimated through long-time continuous observation.

In contrast, in deriving the tropospheric propagation delay amount, the continuous observation unit 124 gives the estimated value as the initial value and/or one value to be added for the continuous observation.

Through this processing, the following effect can be expected: a value of a covariance during an initial period can be set small. As a result, a time period required until the tropospheric propagation delay amount converges can be shortened by adopting this positioning method.

The positioning calculation unit 130 is configured to calculate the position of the terminal based on a plurality of pieces of ranging observation data that are subjected to correction processing individually.

The position and time obtained by the positioning calculation unit 130 are used for necessary purposes (e.g., indication of current time, indication of current position, route search, simple surveying, checking of someone's safety, determination of game event, disaster alert, automated vehicle driving, autonomous robot control, or control of unmanned airplane). Further, the positioning unit 100 (positioning calculation unit 130) records the position and time thus acquired in the memory 140 at any time or at a predetermined timing (e.g., when the positioning is terminated or when the supply of the position and time to an application is stopped).

The memory 140 may not be arranged inside the positioning unit 100 as illustrated in FIG. 2, and may be arranged at any position as long as the memory 140 is a storage area that can be accessed by the continuous observation unit 124. For example, the memory 140 may be arranged inside the correction unit 120, or a storage area of the positioning calculation unit 130 may be used as the memory 140. Further, a work memory of the positioning terminal 10, a flash memory of the positioning terminal 10, or the like may be used as the storage area.

The continuous observation unit 124 may not be arranged inside the positioning unit 100 as illustrated in FIG. 2, and may be arranged at any position as long as the continuous observation unit 124 can access the memory 140 and can determine all or at least part of the values to be caused to converge through the continuous observation (ambiguity, tropospheric propagation delay, and clock difference between positioning terminal and navigation satellite system time) to successively notify the distance correction unit 123 of the determined value. For example, a microcontroller arranged outside the positioning unit 100 may function as the continuous observation unit 124. As another example, a central processing unit (CPU) of a mobile phone serving as the positioning terminal or a CPU of an in-vehicle device may operate as the continuous observation unit 124.

As described above, according to this embodiment, the global navigation satellite system, the positioning terminal, and the positioning method can be provided that are capable of acquiring a high positioning accuracy in a short period of time.

Now, two examples of a method of calculating a theoretical value of the ambiguity by the continuous observation unit 124 described above are described.

The logical expressions given below include Method (6) using a single frequency Li, Method (7) using two frequencies to remove the influence of the ionospheric propagation delay, and Common Expression (8) for calculating a distance to be used in common.

$$N''_{Li} = (\phi_{Li} - \rho'' - C(\delta t_u - \delta t_s) + I_{Li} - T'' - W_{Li})/\lambda_{Li} \quad (6)$$

$$N''_{IF} = (\phi_{IF} - \rho'' - C(\delta t_u - \delta t_s) - T'' - W_{Li})/\lambda_{IF} \quad (7)$$

$$\rho'' = \sqrt{(x_s - x''_u)^2 + (y_s - y''_u)^2 + (z_s - z''_u)^2} + R \quad (8)$$

The variables are as follows. Part of variables already described is omitted.

$N''_{Li}$: ambiguity (theoretical value)

$\rho''$: geometric distance between satellite antenna phase center position and user receiver antenna phase center position (positioning terminal antenna phase center position is read from storage area)

$T''$: tropospheric propagation delay (read from storage area)

$x''_u$, $y''_u$, $z''_u$: positioning terminal antenna phase center position (read from storage area)

$N''_{IF}$: ambiguity (theoretical value) Parameters newly required to calculate the theoretical value of the ambiguity are $x''_u$, $y''_u$, and $z''_u$ in place of $x_u$, $y_u$, and $z_u$, and $T''$ in place of T. Of those values, instead of $T''$, T may be used as it is for the estimated value, but the accuracy is expected to be improved through use of $T''$.

The following values can be used as values to be assigned to $x''_u$, $y''_u$, and $z''_u$.

1. value of positioning result at time of termination of previous positioning
2. value of position obtained by correcting positioning result at time of termination of previous positioning or immediately before interruption of observation based on speed information or the like
3. value of position obtained by correcting position information notified from outside based on speed information or the like A value acquired from an external sensor or a positioning signal may be adopted as the speed information.

For example, in the case of using the value "1.", i.e., in the case of using the value of the positioning result at the time of the termination of the previous observation, a system configuration in this case can be realized with an information source configured to output the precise ephemeris and the correction information (e.g., augmentation satellite 30), a plurality of navigation satellites 20, and the positioning terminal 10 configured to perform precise point positioning.

In this system configuration, the positioning terminal 10 executes processing of recording the position coordinates in the storage area of the storage unit inside the terminal when terminating the positioning and then waiting, and processing of acquiring the position coordinates of the position of the terminal from the value recorded in the storage area at the termination of the positioning when restarting the positioning and using this value as the initial value and/or one value to be added for the continuous observation of the ambiguity. Through addition of this processing, a speed at which a highly accurate positioning result can be acquired is increased as a result.

Further, in the case of using the value "2." or "3.", i.e., in the case of using the value of the position obtained by correcting the value based on the speed information or the like, the positioning terminal 10 uses the speed information acquired from the external sensor or the positioning signal to estimate current position coordinates. This estimation processing may be realized by, for example, calculating a movement amount in consideration of a speed, a movement direction, a time period that has elapsed, and extrapolating current position coordinates based on the movement amount and known position coordinates.

The tropospheric propagation delay amount $T''$ includes, as a variable factor that is not effectively modeled by publicly-known methods, an amount of water vapor distributed up to 4 km above the Earth's surface.

With many methods of estimating the tropospheric propagation delay amount, the tropospheric propagation delay amount converges to a value that is approximately close to its true value. Further, a change over time of the tropospheric propagation delay amount is not steep in general. Therefore, the positioning terminal 10 can determine whether or not to use an estimated value at the time of the termination of the previous positioning based on a time period that has elapsed. Further, the positioning terminal 10 can use information as to whether or not weather has changed as a basis for determination. The positioning terminal 10 may acquire the estimated value of the tropospheric propagation delay amount estimated by a near positioning terminal or the like via communication or the like.

Example

Next, this invention is described by way of Example.

In the following description, an existing GPS satellite is used as the navigation satellite, and a quasi-zenith satellite is used as the augmentation satellite.

Figure 3:
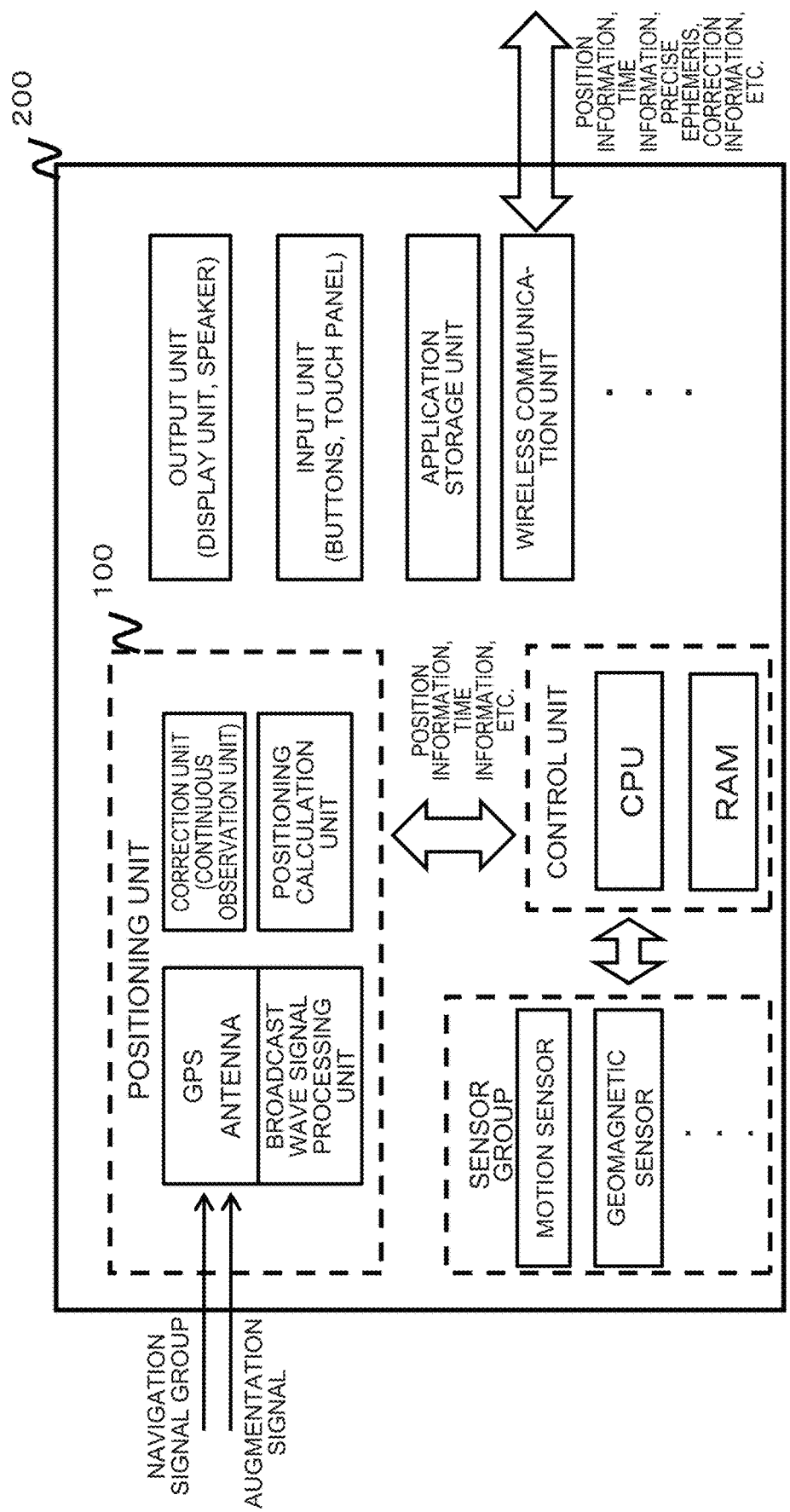
FIG. 3 is a block diagram for illustrating a mobile terminal serving as the positioning terminal according to Example of this invention.

FIG. 3 is a block diagram for illustrating a mobile terminal 200 serving as the positioning terminal.

The mobile terminal 200 illustrated in FIG. 3 is a mobile terminal including a wireless communication unit capable of receiving a mobile communication service. Further, the mobile terminal 200 is configured to operate hardware such as a CPU based on application programs to provide various services to a user.

As illustrated in FIG. 3, the mobile terminal 200 includes the above-mentioned positioning unit 100 built therein, in addition to a control unit (CPU), a read only memory (ROM), a random access memory (RAM), an input/output unit, various sensors, the wireless communication unit, and others, which are also built therein. Further, as illustrated in FIG. 3, the positioning unit 100 may use a built-in GPS antenna. It should be understood that the positioning unit 100 may use an external GPS antenna.

The mobile terminal 200 (positioning unit 100) of this Example is configured to receive two-frequency signals from a large number of satellites (GPS satellites and quasi-zenith satellite) to acquire the position of the terminal and the current time. The mobile terminal 200 is configured to receive a plurality of navigation signals from the GPS satellites and receive the precise ephemeris and others from the quasi-zenith satellite to enhance the accuracy of positioning that is based on the plurality of navigation signals.

In this positioning process, when the processing of causing each value of the error cause to converge through the continuous observation is performed, the above-mentioned method is executed. With this, a highly accurate positioning result can be acquired quickly.

In response to a request made by an application (control unit) or in an autonomous manner, the positioning unit 100 of the mobile terminal 200 acquires a plurality of GPS signal waves (L1C/A) to start positioning. At this time, the positioning unit 100 identifies the augmentation signal and the precise ephemeris that are broadcast from the quasi-zenith satellite along with the GPS signal waves (L1C/A) and uses those signals for correction processing.

Next, an example of a processing operation performed by the mobile terminal 200 is described.

The mobile terminal 200 causes the multi-frequency signal processing unit 110 to separate the two-frequency navigation signal received via the GPS antenna into desired signals appropriately. Further, the mobile terminal 200 separates the augmentation signal relating to each GPS satellite, which is broadcast from the quasi-zenith satellite serving as the augmentation satellite. Further, the mobile terminal 200 separates information to be used for the positioning, such as the precise ephemeris, from each signal.

The correction unit 120 acquires the ranging observation data from the L1C/A signal of each satellite, and identifies the correction information included in the augmentation signal, which includes the time and orbit of the GPS satellite and the information on the ionosphere, and others. The correction unit 120 uses the identified augmentation signal such as the correction information for suitable purposes to enhance the positioning speed and the positioning accuracy. At this time, in this processing operation, the information on the ionosphere included in the augmentation signal is not used, and processing of cancelling the ionospheric delay component through use of an amount of a difference in delay between two frequencies is executed. With this, the positioning accuracy of the precise point positioning can be enhanced further.

In addition, in the process of causing each value of the error cause to converge through the continuous observation, the correction unit 120 acquires from the RAM each value of the position of the terminal that is estimated from known parameters that are not based on the navigation signal observed this time to accelerate convergence of the ambiguity. In addition, the correction unit 120 acquires from the RAM the estimated value of the ionospheric delay amount to accelerate convergence of the ionospheric delay amount. In the RAM, the value recorded by the terminal and the value acquired by the positioning terminal 200 via the wireless communication unit to be used when starting or restarting the positioning are stored in advance.

A method for realizing this may be embodied with Expressions (7) and (8) using a program or a circuit network.

The positioning calculation unit 130 is configured to perform the positioning calculation to acquire the position of the terminal based on the distances to the respective satellites, which are subjected to correction processing individually, and others. Further, the positioning calculation unit 130 is configured to extract the current time from the navigation signal. The position information and the time information that are output are used inside the mobile terminal 200 as needed. Further, the position information and the time information are recorded in the RAM at the same time. The position information and the time information may be recorded in the memory other than the RAM or in the storage area inside the positioning unit 100.

Next, a description is given of an example of measurement results, which were obtained by using the above-mentioned method in the positioning terminal 10 in order to cause the estimation of the ambiguity to converge quickly.

FIG. 4 to FIG. 7 are graphs for showing results obtained when each value of the position of the terminal that had been estimated from the known parameters that were not based on the navigation signal observed this time was acquired from the storage area, and the acquired value was used for calculation of a value to be inserted for the continuous observation.

Figure 4:
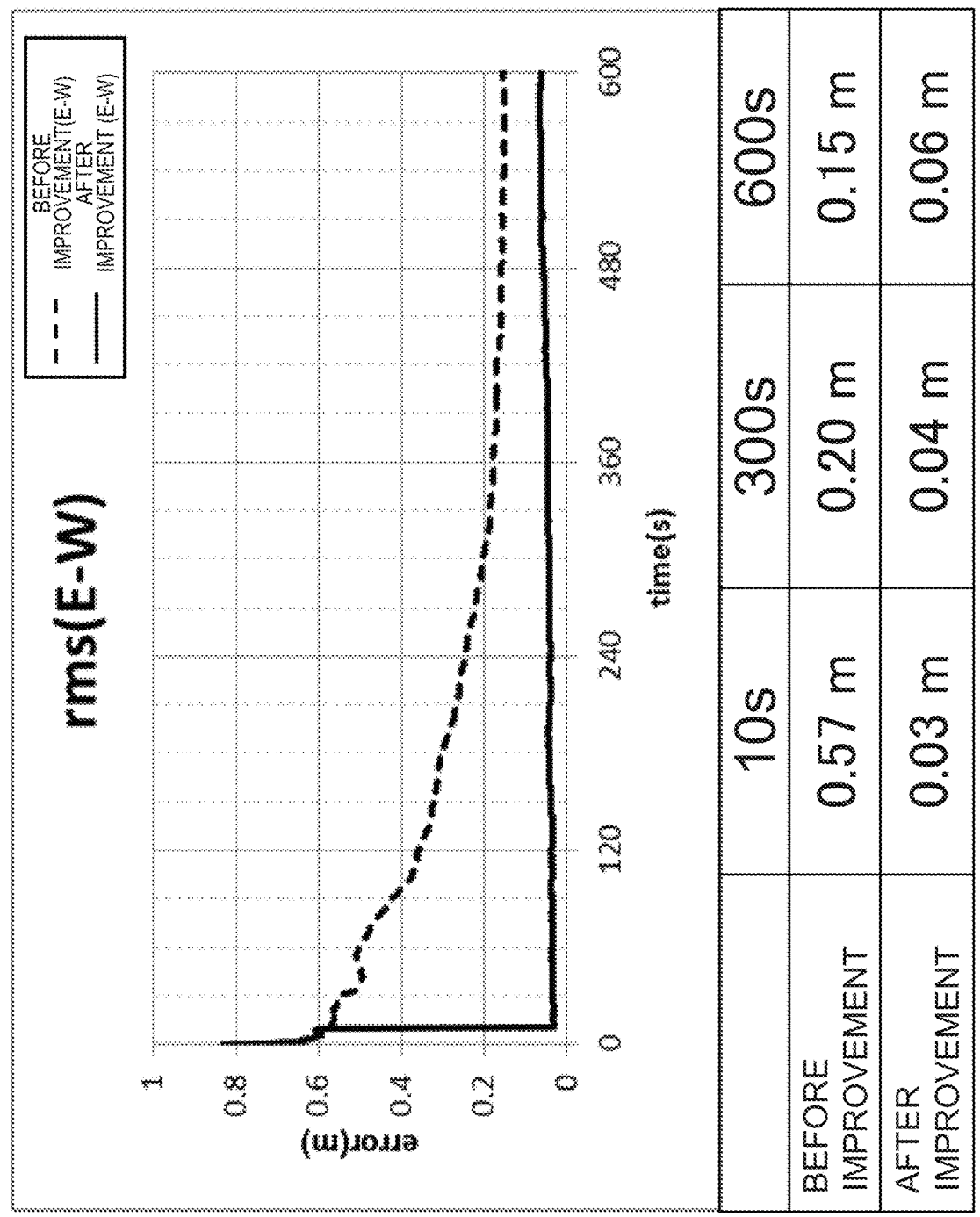
FIG. 4 is a graph for showing a result (east-west) of a simulation of processing of causing a value of an ambiguity to converge in the positioning terminal according to Example.
Figure 5:
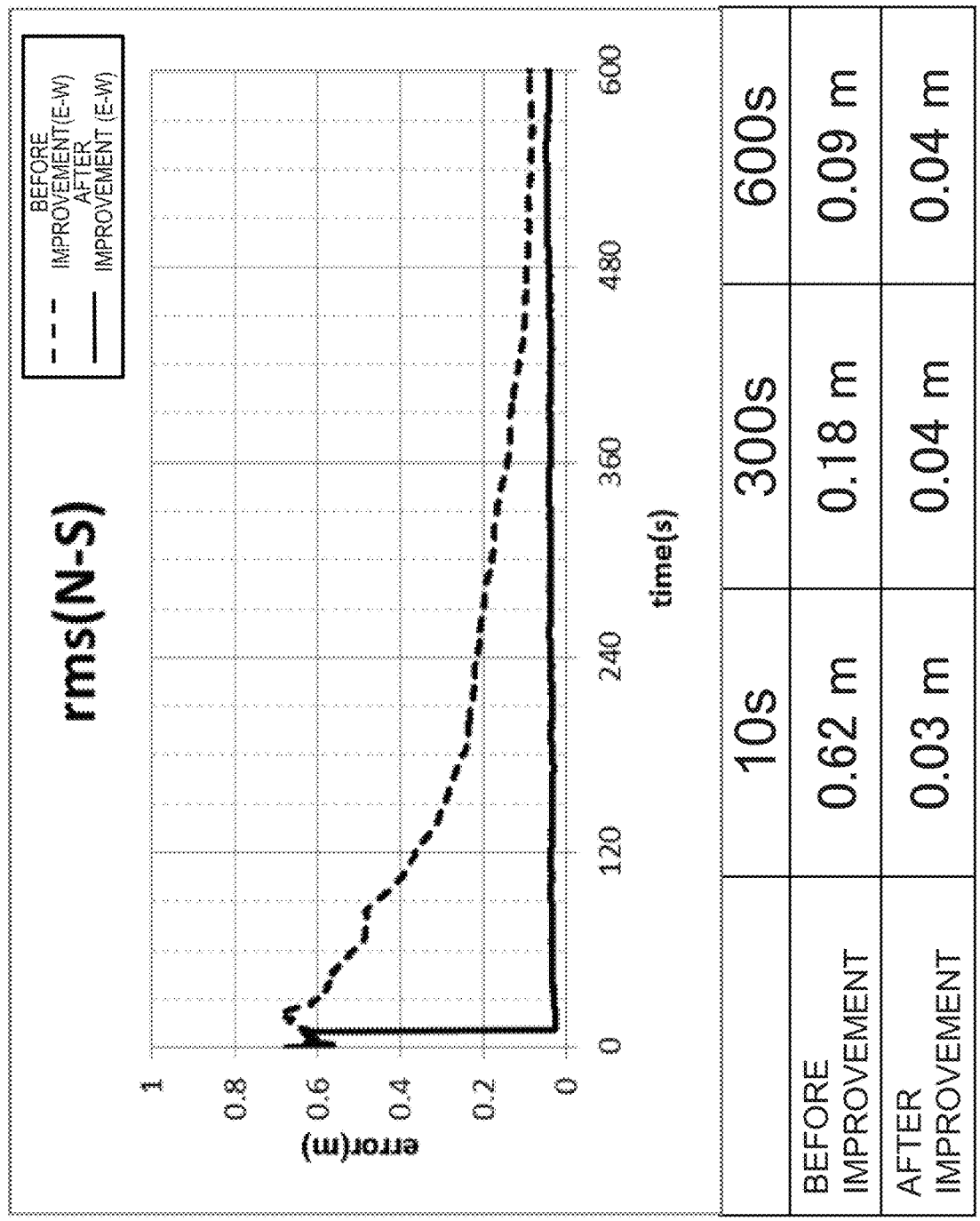
FIG. 5 is a graph for showing a result (south-north) of a simulation of processing of causing a value of an ambiguity to converge in the positioning terminal according to Example.
Figure 6:
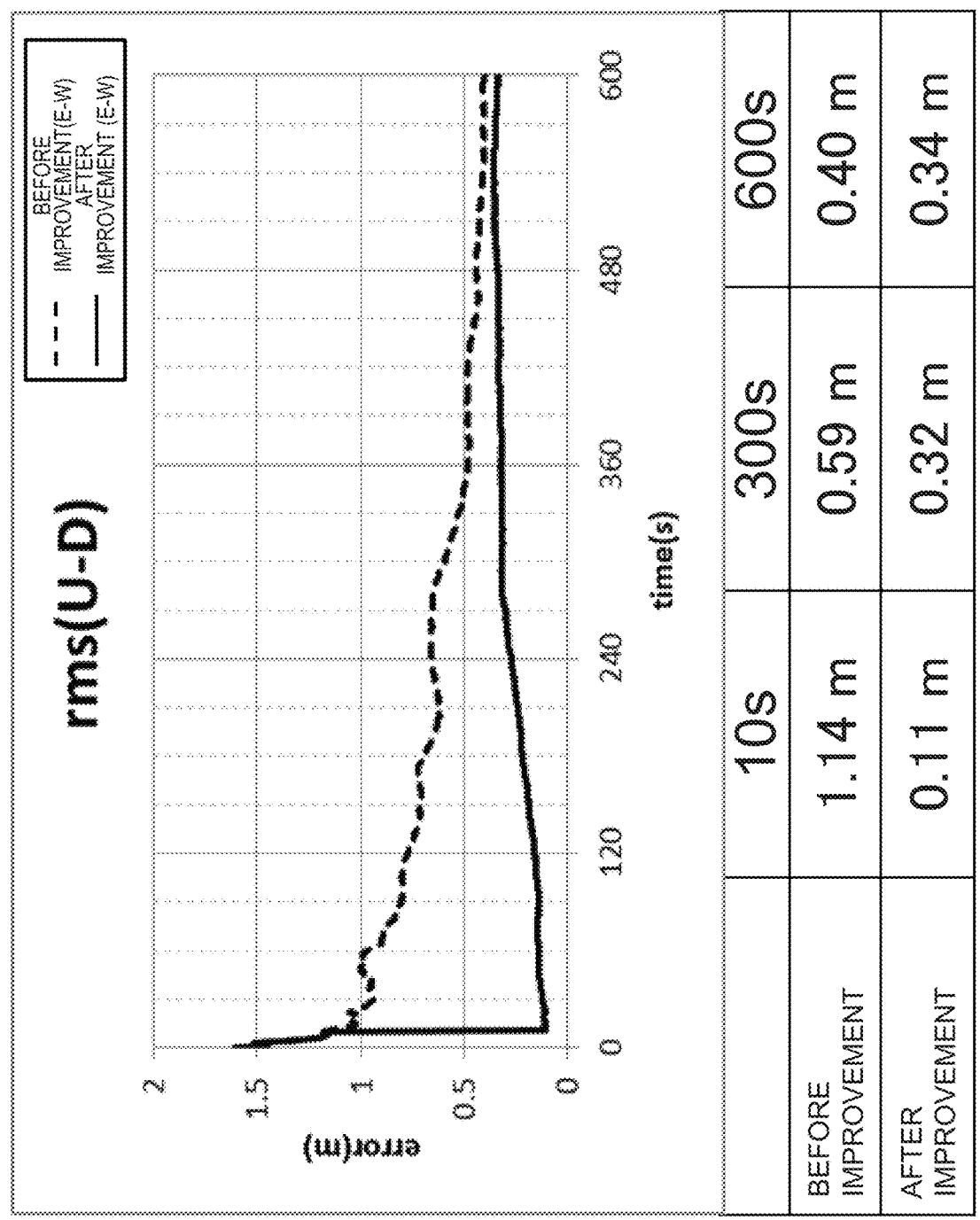
FIG. 6 is a graph for showing a result (up-down) of a simulation of processing of causing a value of an ambiguity to converge in the positioning terminal according to Example.
Figure 7:
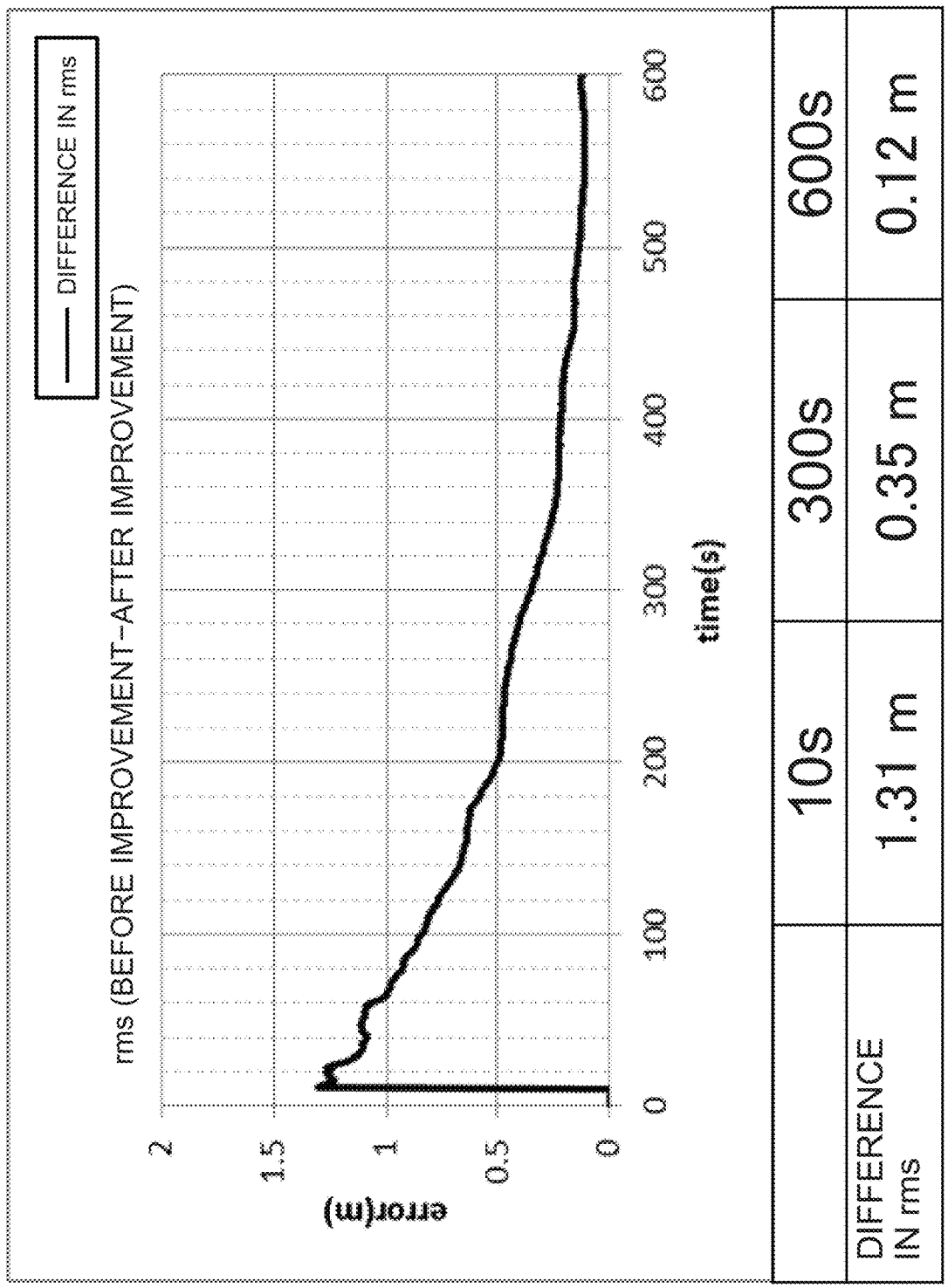
FIG. 7 is a graph for showing a difference between an improved method and an existing method shown in FIG. 4 to FIG. 6.

FIG. 4 to FIG. 6 are illustrations of results for east-west (FIG. 4), north-south (FIG. 5), and up-down (FIG. 6), respectively. FIG. 7 is an illustration of a difference between an improved method and an existing method shown in FIG. 4 to FIG. 6.

At a point of 10 seconds in each of the graphs, the position coordinates acquired from the storage area were input for calculation as the value to be inserted. As shown in the graphs, with this method, after the value to be inserted for the continuous observation was input, an error between an estimated value of the ambiguity and its true value significantly decreased. In short, a time period required until accurate positioning can be achieved can be shortened.

Therefore, this positioning method can enhance convenience in services required to perform positioning in real time. Further, this positioning method is advantageous also for the movement of the positioning terminal. For example, this positioning method can be used for various purposes for accurate positioning at a vehicle, a mobile phone, a smartphone, or the like.

To describe more specifically, when a mobile body (positioning terminal) passes through an environment in which the mobile body is shielded from the outside (e.g., tunnel, underground parking space, or inside of a construction), a resource and time required for the mobile body (positioning terminal) to perform reestimation processing for the ambiguity are reduced. This is because when observation is restarted with this method, a time period required until a highly accurate value is acquired can be shortened. When the observation is interrupted instantaneously, it is not always necessary to perform reestimation processing for the tropospheric delay and reestimation processing for the clock difference between the positioning terminal and satellite system time, and a value that was acquired before the interruption of the observation may be used appropriately. The reestimation processing may be configured to be executed when, for example, the positioning terminal recognizes the elapse of a predetermined time period or a predetermined weather change.

Components of the positioning terminal may be appropriately implemented by a combination of hardware and software. In the mode where the components are a combination of hardware and software, one or a plurality of the components are implemented as various means by deploying a control program according to this invention in a RAM and causing a microcomputer, a control unit (CPU), and other pieces of hardware to operate as programmed by the program. The program may be recorded non-transitorily in a recording medium to be distributed. The program recorded in the recording medium is read onto a memory via cable communication, wireless communication, or the recording medium itself, and runs the control unit and others. Examples of the recording medium include optical discs, magnetic disks, semiconductor memory devices, and hard disks.

As described in the above description of the embodiment, according to this invention, it is possible to provide a global navigation satellite system, a positioning terminal, and a positioning method, which are capable of acquiring a high positioning accuracy in a shorter time period than an existing global navigation satellite system having an equivalent accuracy. It is also possible to provide a program for executing this positioning method and a recording medium having the program non-transitorily recorded thereon.

Further, the specific configuration of this invention is not limited to the embodiment described above, and modifications without departing from the gist of this invention, such as separation and combination of block components and interchange of the procedures, are encompassed within this invention.

Further, part or whole of the above-mentioned embodiments and examples can also be described as follows. Note that, the following notes are not intended to limit this invention.

[Supplementary Note 1]

A positioning terminal, which is configured to:

receive a plurality of navigation signals from a plurality of navigation satellites configured to broadcast the navigation signal for a GNSS, and acquire a precise ephemeris and correction information from an information source configured to output the precise ephemeris and the correction information;

use, in a process of causing each value of error causes including an ambiguity to converge through a plurality of times of observation to enhance an accuracy of positioning that is based on the plurality of navigation signals through continuous observation, for one or more error causes exhibiting a value that is different depending on a relation with another terminal, each value of one or more error causes calculated by acquiring each value of a position of the positioning terminal recorded in advance in a storage area as an initial value and/or one value to be added for the continuous observation, and then successively calculate the position of the positioning terminal that is based on the received plurality of navigation signals while causing at least an error component relating to the ambiguity to converge through the continuous observation.

[Supplementary Note 2]

A positioning terminal, including:

a broadcast wave signal processing unit configured to receive, from a plurality of navigation satellites configured to broadcast a navigation signal for a GNSS, at least a plurality of the navigation signals to output ranging observation data;

a correction unit configured to, in a process of causing each value of error causes relating to an ambiguity and a tropospheric propagation delay to converge through continuous observation including a plurality of times of observation as part of correction for enhancing an accuracy of positioning that is based on the plurality of the navigation signals, for the ambiguity and the tropospheric propagation delay, which exhibit a value that is different depending on a relation with another terminal, adopt each value of the error causes calculated by acquiring each value of a position of the positioning terminal recorded in advance in a storage area as an initial value and/or one value to be added for the continuous observation, and then determine a value to be used for correction as each value of the error causes to correct the ranging observation data; and a positioning calculation unit configured to cancel error components relating to the ambiguity and the tropospheric propagation delay based on the ranging observation data successively corrected by the correction unit to successively calculate the position of the positioning terminal having the error components canceled.

[Supplementary Note 3]

A positioning terminal, including:

a broadcast wave signal processing unit configured to receive at least a plurality of navigation signals to output ranging observation data;

a correction unit configured to, in a process of causing each value of error causes to converge through continuous observation including a plurality of times of observation as part of correction for enhancing an accuracy of positioning, acquire each value of a position of the positioning terminal recorded in advance in a storage area to calculate each value of the error cause, use the calculated each value as an initial value and/or one value to be added for the continuous observation and then determine each value of the error cause to be used for correction, and execute the correction of the ranging observation data; and a positioning calculation unit configured to perform positioning calculation by canceling an error component based on the ranging observation data corrected by the correction unit to calculate the position of the positioning terminal having the error components canceled.

[Supplementary Note 4]

The positioning terminal according to the above-mentioned supplementary notes, in which the positioning terminal is configured to:

receive a plurality of navigation signals for the GNSS, and acquire a precise ephemeris and correction information from an information source configured to output the precise ephemeris and the correction information;

use, by the correction unit, when enhancing the accuracy of the positioning through the continuous observation, a value of an ambiguity calculated based on each value of the position of the positioning terminal recorded in the storage area as the initial value and/or the one value to be added for the continuous observation to cause the value of the ambiguity to be used for correction to converge; and perform, by the positioning calculation unit, positioning calculations reflecting at least part of the correction information, the precise ephemeris, and each value of the error cause.

[Supplementary Note 5]

The positioning terminal according to the above-mentioned supplementary notes, in which the correction unit is configured to, when causing error causes including an ambiguity and a tropospheric propagation delay, which exhibit a value that is different for each positioning terminal, to converge, acquire from the storage area each value relating to the position of the positioning terminal to be used as the initial value and/or the one value to be added to determine each value of the error causes including the ambiguity and the tropospheric propagation delay.

[Supplementary Note 6]

A positioning terminal according to the above-mentioned supplementary notes, in which the positioning terminal is configured to:

receive, by the broadcast wave signal processing unit, a multi-frequency navigation signal from each of a plurality of navigation satellites, and receive an augmentation signal broadcast from an augmentation satellite;

use, by the correction unit, when enhancing the accuracy of the positioning through the continuous observation, each value of the error cause calculated based on each value of the position of the positioning terminal recorded in the storage area as the initial value and/or the one value to be added for the continuous observation to cause each value of the error cause to be used for correction to converge, and calculate correction information on an ionospheric delay component based on a difference in delay among the multi-frequency navigation signals transmitted from the plurality of navigation satellites without using ionospheric correction information included in the augmentation signal; and perform, by the positioning calculation unit, positioning calculations reflecting the calculated correction information on the ionospheric delay component, the precise ephemeris, and each value of the error cause.

[Supplementary Note 7]

The positioning terminal according to the above-mentioned supplementary notes, in which the positioning terminal is configured to:

hold, when terminating positioning, each value of the position of the positioning terminal in the storage area and then terminate the positioning; and acquire, when having newly started positioning, from the storage area of a storage unit, a previous value of the position of the positioning terminal for which positioning has been terminated, and determine, through calculation, a value of an ambiguity at a current time to be used as the initial value and/or the one value to be added for the continuous observation.

[Supplementary Note 8]

The positioning terminal according to the above-mentioned supplementary notes, in which the positioning terminal is configured to calculate or acquire an amount of movement of the positioning terminal, and to use a value obtained by adding the movement amount to a previous value of the position of the positioning terminal acquired from the storage area to determine, through calculation, a value of an ambiguity at a current time to be used as the initial value and/or the one value to be added for the continuous observation.

[Supplementary Note 9]

The positioning terminal according to the above-mentioned supplementary notes, in which the positioning terminal is configured to:

receive each value of the position of the positioning terminal as external information and record the each value in the storage area; and acquire, when having newly started positioning, each value of the position of the positioning terminal, which is recorded in the storage area and acquired from the external information, to determine, through calculation, a value of an ambiguity at a current time to be used as the initial value and/or the one value to be added for the continuous observation.

[Supplementary Note 10]

The positioning terminal according to the above-mentioned supplementary notes, in which the positioning terminal is configured to:

receive each value of the position of the positioning terminal and time of the positioning terminal as external information and record the each value and the time in the storage area; and calculate or acquire an amount of movement of the positioning terminal from the time, and use a value obtained by adding the movement amount to each value of the position of the positioning terminal, which is recorded in the storage area and acquired from the external information, to determine, through calculation, a value of an ambiguity at a current time to be used as the initial value and/or the one value to be added for the continuous observation.

[Supplementary Note 11]

The positioning terminal according to the above-mentioned supplementary notes, in which the positioning terminal is configured to:

receive as external information a value of a tropospheric propagation delay amount that is measured within a predetermined time period and/or a predetermined weather change level and within an area close to the position of the positioning terminal and record the received value in the storage area; and use the value of the tropospheric propagation delay amount, which is recorded in the storage area as the value of the tropospheric propagation delay amount to be used as the initial value and/or the one value to be added for the continuous observation, and is acquired from the external information, to determine the value of the tropospheric propagation delay amount along with a value of an ambiguity.

[Supplementary Note 12]

A positioning method to be performed by a positioning terminal of a global navigation satellite system, including:

acquiring, by the positioning terminal, from a plurality of navigation satellites for the GNSS and an information source configured to output a precise ephemeris and correction information, a plurality of navigation signals, the precise ephemeris, and the correction information;

acquiring, by the positioning terminal, in a process of causing each value of error causes including an ambiguity to converge through a plurality of times of continuous observation to enhance an accuracy of positioning that is based on the plurality of navigation signals through continuous observation, each value of a position of the positioning terminal recorded in advance in a storage area to calculate each value of the error cause;

using, by the positioning terminal, the calculated each value as an initial value and/or one value to be added for the continuous observation to cause each value of the error cause to converge; and performing, by the positioning terminal, positioning calculations reflecting at least part of the correction information, the precise ephemeris, and each value of the error cause.

[Supplementary Note 13]

The positioning method according to the above-mentioned supplementary notes, in which the positioning terminal is configured to, when causing error causes including an ambiguity and a tropospheric propagation delay, which exhibit a value that is different for each positioning terminal, to converge, acquire from the storage area each value relating to the position of the positioning terminal to be used as the initial value and/or the one value to be added to determine each value of the error causes including the ambiguity and the tropospheric propagation delay.

[Supplementary Note 14]

The positioning method according to the above-mentioned supplementary notes, in which the positioning terminal is configured to:

receive a multi-frequency navigation signal from each of a plurality of navigation satellites, and receive an augmentation signal broadcast from an augmentation satellite;

use, when enhancing the accuracy of the positioning through the continuous observation, each value of the error cause calculated based on each value of the position of the positioning terminal recorded in the storage area as the initial value and/or the one value to be added for the continuous observation to cause each value of the error cause to be used for correction to converge, and calculate correction information on an ionospheric delay component based on a difference in delay among the multi-frequency navigation signals transmitted from the plurality of navigation satellites without using ionospheric correction information included in the augmentation signal; and perform positioning calculations reflecting the calculated correction information on the ionospheric delay component, the precise ephemeris, and each value of the error cause.

[Supplementary Note 15]

The positioning method according to the above-mentioned supplementary notes, in which the positioning terminal is configured to:

hold, when terminating positioning, each value of the position of the positioning terminal in the storage area and then terminate the positioning; and acquire, when having newly started positioning, from the storage area of a storage unit, a previous value of the position of the positioning terminal for which positioning has been terminated, and determine, through calculation, a value of an ambiguity at a current time to be used as the initial value and/or the one value to be added for the continuous observation.

[Supplementary Note 16]

The positioning method according to the above-mentioned supplementary notes, in which the positioning terminal is configured to calculate or acquire an amount of movement of the positioning terminal, and to use a value obtained by adding the movement amount to a previous value of the position of the positioning terminal acquired from the storage area to determine, through calculation, a value of an ambiguity at a current time to be used as the initial value and/or the one value to be added for the continuous observation.

[Supplementary Note 17]

The positioning method according to the above-mentioned supplementary notes, in which the positioning terminal is configured to:

receive each value of the position of the positioning terminal as external information and record the each value in the storage area; and acquire, when having newly started positioning, each value of the position of the positioning terminal, which is recorded in the storage area and acquired from the external information, to determine, through calculation, a value of an ambiguity at a current time to be used as the initial value and/or the one value to be added for the continuous observation.

[Supplementary Note 18]

The positioning method according to the above-mentioned supplementary notes, in which the positioning terminal is configured to:

receive each value of the position of the positioning terminal and time of the positioning terminal as external information and record the each value and the time in the storage area; and calculate or acquire an amount of movement of the positioning terminal from the time, and use a value obtained by adding the movement amount to each value of the position of the positioning terminal, which is recorded in the storage area and acquired from the external information, to determine, through calculation, a value of an ambiguity at a current time to be used as the initial value and/or the one value to be added for the continuous observation.

[Supplementary Note 19]

The positioning method according to the above-mentioned supplementary notes, in which the positioning terminal is configured to:

receive as external information a value of a tropospheric propagation delay amount that is measured within a predetermined time period and/or a predetermined weather change level and within an area close to the position of the positioning terminal and record the received value in the storage area; and use the value of the tropospheric propagation delay amount, which is recorded in the storage area as the value of the tropospheric propagation delay amount to be used as the initial value and/or the one value to be added for the continuous observation, and is acquired from the external information, to determine the value of the tropospheric propagation delay amount along with a value of an ambiguity.

[Supplementary Note 20]

A program for positioning, for causing a processor included in a positioning terminal to operate so as to:

acquire, in a process of causing each value of error causes including an ambiguity to converge through a plurality of times of continuous observation to enhance an accuracy of positioning that is based on a plurality of navigation signals through continuous observation, each value of a position of the positioning terminal recorded in advance in a storage area to calculate each value of the error cause; and use, the calculated each value as an initial value and/or one value to be added for the continuous observation to cause each value of the error cause to converge.

[Supplementary Note 21]

A program for positioning, for causing a processor included in a positioning terminal to operate so as to:

acquire a plurality of navigation signals, a precise ephemeris, and correction information; and use, in a process of causing each value of error causes including an ambiguity to converge through continuous observation including a plurality of times of observation to enhance an accuracy of positioning that is based on the plurality of navigation signals through continuous observation, for one or more error causes exhibiting a value that is different depending on a relation with another terminal, each value of the one or more error causes calculated by acquiring a value of a position of the positioning terminal recorded in advance in a storage area as an initial value and/or one value to be added for the continuous observation, and then successively calculate the position of the positioning terminal that is based on the received plurality of navigation signals while causing at least an error component relating to the ambiguity to converge through the continuous observation.

[Supplementary Note 22]

A program for positioning, for causing a processor included in a positioning terminal to operate so as to:

adopt, in a process of causing each value of error causes relating to an ambiguity and a tropospheric propagation delay to converge through a plurality of times of continuous observation as part of correction for enhancing an accuracy of positioning that is based on a plurality of the navigation signals, for the ambiguity and the tropospheric propagation delay, each of which exhibits a value that is different depending on a relation with another terminal, each value of the error causes calculated by acquiring a value of a position of the positioning terminal recorded in advance in a storage area as an initial value and/or one value to be added for the continuous observation, and then determine a value to be used for correction as each value of the error causes to correct a ranging observation data; and cancel error components relating to the ambiguity and the tropospheric propagation delay based on the successively corrected ranging observation data to successively calculate the position of the positioning terminal having the error components canceled.

[Supplementary Note 23]

A program for positioning, for causing a processor included in a positioning terminal to operate so as to, in a process of causing each value of error causes to converge through continuous observation including a plurality of times of observation as part of correction for enhancing an accuracy of positioning, acquire each value of a position of the positioning terminal recorded in advance in a storage area to calculate each value of the error cause, use the calculated each value as an initial value and/or one value to be added for the continuous observation and then determine each value of the error cause to be used for correction, and execute the correction of ranging observation data.

[Supplementary Note 24]

The program for positioning according to the above-mentioned supplementary notes, in which the program for positioning causes the processor to use the corrected ranging observation data to successively perform positioning calculation.

[Supplementary Note 25]

The program for positioning according to the above-mentioned supplementary notes, in which the program for positioning causes the positioning terminal to operate so as to:

acquire the plurality of navigation signals for a GNSS, the precise ephemeris, and the correction information;

use, when enhancing the accuracy of the positioning through the continuous observation, a value of the ambiguity calculated based on each value of the position of the positioning terminal recorded in the storage area as the initial value and/or the one value to be added for the continuous observation to cause the value of the ambiguity to be used for correction to converge; and perform positioning calculations reflecting at least part of the correction information, the precise ephemeris, and each value of the error cause.

[Supplementary Note 26]

The program for positioning according to the above-mentioned supplementary notes, in which the program for positioning causes the positioning terminal to operate so as to, when causing error causes including an ambiguity and a tropospheric propagation delay, which exhibit a value that is different for each positioning terminal, to converge, acquire from the storage area each value relating to the position of the positioning terminal to be used as the initial value and/or the one value to be added to determine each value of the error causes including the ambiguity and the tropospheric propagation delay.

[Supplementary Note 27]

The program for positioning according to the above-mentioned supplementary notes, in which the program for positioning causes the positioning terminal to operate so as to:

receive a multi-frequency navigation signal from each of a plurality of navigation satellites, and receive an augmentation signal broadcast from an augmentation satellite;

use, when enhancing the accuracy of the positioning through the continuous observation, each value of the error cause calculated based on each value of the position of the positioning terminal recorded in the storage area as the initial value and/or the one value to be added for the continuous observation to cause each value of the error cause to be used for correction to converge, and calculate correction information on an ionospheric delay component based on a difference in delay among the multi-frequency navigation signals transmitted from the plurality of navigation satellites without using ionospheric correction information included in the augmentation signal; and perform positioning calculations reflecting the calculated correction information on the ionospheric delay component, the precise ephemeris, and each value of the error cause.

[Supplementary Note 28]

The program for positioning according to the above-mentioned supplementary notes, in which the program for positioning causes the positioning terminal to operate so as to: hold, when terminating positioning, each value of the position of the positioning terminal in the storage area and then terminate the positioning; and acquire, when having newly started positioning, from the storage area of a storage unit, a previous value of the position of the positioning terminal for which positioning has been terminated, and determine, through calculation, a value of an ambiguity at a current time to be used as the initial value and/or the one value to be added for the continuous observation.

[Supplementary Note 29]

The program for positioning according to the above-mentioned supplementary notes, in which the program for positioning causes the positioning terminal to operate so as to calculate or acquire an amount of movement of the positioning terminal, and to use a value obtained by adding the movement amount to a previous value of the position of the positioning terminal acquired from the storage area to determine, through calculation, a value of an ambiguity at a current time to be used as the initial value and/or the one value to be added for the continuous observation.

[Supplementary Note 30]

The program for positioning according to the above-mentioned supplementary notes, in which the program for positioning causes the positioning terminal to operate so as to:

receive each value of the position of the positioning terminal as external information and record the each value in the storage area; and acquire, when having newly started positioning, each value of the position of the positioning terminal, which is recorded in the storage area and acquired from the external information, to determine, through calculation, a value of an ambiguity at a current time to be used as the initial value and/or the one value to be added for the continuous observation.

[Supplementary Note 31]

The program for positioning according to the above-mentioned supplementary notes, in which the program for positioning causes the positioning terminal to operate so as to:

receive each value of the position of the positioning terminal and time of the positioning terminal as external information and record the each value and the time in the storage area; and calculate or acquire an amount of movement of the positioning terminal from the time, and use a value obtained by adding the movement amount to each value of the position of the positioning terminal, which is recorded in the storage area and acquired from the external information, to determine, through calculation, a value of an ambiguity at a current time to be used as the initial value and/or the one value to be added for the continuous observation.

[Supplementary Note 32]

The program for positioning according to the above-mentioned supplementary notes, in which the program for positioning causes the positioning terminal to operate so as to:

receive as external information a value of a tropospheric propagation delay amount that is measured within a predetermined time period and/or a predetermined weather change level and within an area close to the position of the positioning terminal and record the received value in the storage area; and use the value of the tropospheric propagation delay amount, which is recorded in the storage area as the value of the tropospheric propagation delay amount to be used as the initial value and/or the one value to be added for the continuous observation, and is acquired from the external information, to determine the value of the tropospheric propagation delay amount along with a value of an ambiguity.

[Supplementary Note 33]

A recording medium having the program for positioning according to any one of the above-mentioned supplementary notes non-transitorily recorded thereon.

[Supplementary Note 22]

A recording medium having a program for positioning non-transitorily recorded thereon, the program for positioning causing a processor of a positioning terminal to operate so as to:

A recording medium having a program non-transitorily recorded thereon, the program causing a processor included in a positioning terminal to operate so as to:

acquire, in a process of causing each value of error causes including an ambiguity to converge through a plurality of times of continuous observation to enhance an accuracy of positioning that is based on a plurality of navigation signals through continuous observation, each value of a position of the positioning terminal recorded in advance in a storage area to calculate each value of the error cause; and use the calculated each value as an initial value and/or one value to be added for the continuous observation to cause each value of the error cause to converge.

INDUSTRIAL APPLICABILITY

According to this invention, the immediacy and positioning accuracy of the global navigation satellite system can be enhanced. Through use of this method, beneficial effects are achieved for many services that are based on point positioning or the like. Examples of such services include a navigation service, a current position indication service, a tracking service, a security service, a game service, and a service that uses two or more of those services in combination. In those services, there is a demand for a scheme that allows more accurate position information to be acquired quickly.

In addition, by combining this method with another effective correction method, an accuracy in the order of centimeters can be realized through point positioning quickly.

This application claims priority from Japanese Patent Application No. 2013-271986, filed on Dec. 27, 2013, the entire disclosure of which is incorporated herein by reference.

REFERENCE SIGNS LIST

10 positioning terminal
20 navigation satellite
30 augmentation satellite
100 positioning unit (positioning means)
110 broadcast wave signal processing unit (broadcast wave signal processing means)
111 first frequency signal processing unit
11$n$ n-th frequency signal processing unit
120 correction unit (correction means)
121 positioning augmentation unit (positioning augmentation means)
122 multi-frequency ionospheric propagation delay correction unit (multi-frequency ionospheric propagation delay correction means)
123 distance correction unit (distance correction means)
124 continuous observation unit (continuous observation means, AC (ambiguity convergence) means)
130 positioning calculation unit (positioning calculation means)
140 memory (recording means, recording region)
200 mobile terminal

What is claimed is:

1. A positioning terminal, comprising:
a broadcast wave signal processing unit configured to receive at least a plurality of navigation signals to output ranging observation data;
a correction unit configured to, in a process of causing each value of error including an ambiguity and a tropospheric propagation delay amount to converge through continuous observation, simultaneously with processing relating to a determination of the ambiguity, acquire and store to a storage area, a value of the tropospheric propagation delay amount that has been measured within an area close to a position of the positioning terminal from another device, and use the value of the tropospheric propagation delay amount as an initial value or one value to be added for the continuous observation, and simultaneously with processing relating to a determination of the tropospheric propagation delay amount, acquire each value of the position of the positioning terminal recorded in advance in the storage area and the value of the tropospheric propagation delay amount that has been measured within the area close to the position of the positioning terminal from the another device to calculate a value of the ambiguity, use the calculated value of the ambiguity as an initial value or one value to be added for the continuous observation, and then determine each value of the error to be used for correction, and execute the correction of the ranging observation data; and
a positioning calculation unit configured to perform precise point positioning (PPP) calculation by canceling an error component based on the ranging observation data corrected by the correction unit to calculate the position of the positioning terminal having the error components canceled.

2. The positioning terminal according to claim 1, wherein the positioning terminal is configured to:
receive the plurality of navigation signals for a GNSS, and acquire a precise ephemeris, correction information and the value of tropospheric propagation delay amount from an information source(s) configured to output the precise ephemeris, the correction information and the value of tropospheric propagation delay amount that is measured within the area close to position of the positioning terminal;
use, by the correction unit, when enhancing the accuracy of the positioning through the continuous observation, the value of the ambiguity calculated based on each value of the position of the positioning terminal recorded in the storage area as the initial value and/or the one value to be added for the continuous observation to cause the value of the ambiguity to be used for correction to converge; and
perform, by the positioning calculation unit, positioning calculations reflecting at least part of the correction information, the precise ephemeris, and each value of the error.

3. The positioning terminal according to claim 1, wherein the positioning terminal is configured to:
receive, by the broadcast wave signal processing unit, a multi-frequency navigation signal from each of a plurality of navigation satellites, and receive an augmentation signal broadcast from an augmentation satellite;
use, by the correction unit, when enhancing the accuracy of the positioning through the continuous observation, each value of the error calculated based on each value of the position of the positioning terminal recorded in the storage area as the initial value and/or the one value to be added for the continuous observation to cause each value of the error to be used for correction to converge, and calculate correction information on an ionospheric delay component based on a difference in delay among the multi-frequency navigation signals transmitted from the plurality of navigation satellites without using ionospheric correction information included in the augmentation signal; and
perform, by the positioning calculation unit, positioning calculations reflecting the calculated correction information on the ionospheric delay component, the precise ephemeris, and each value of the error.

4. The positioning terminal according to claim 1, wherein the positioning terminal is configured to:
hold, when terminating positioning, each value of the position of the positioning terminal in the storage area and then terminate the positioning; and
acquire, when having newly started positioning, from the storage area of a storage unit, a previous value of the position of the positioning terminal for which positioning has been terminated, and determine, through calculation, the value of the ambiguity at a current time to be used as the initial value and/or the one value to be added for the continuous observation.

5. The positioning terminal according to claim 1,
wherein the positioning terminal is carried in a vehicle having an in-vehicle computer,
wherein the positioning terminal is configured to calculate an amount of movement of the positioning terminal or acquire the amount of movement of the positioning terminal form the in-vehicle computer, and to use a value obtained by adding the movement amount to a previous value of the position of the positioning terminal acquired from the storage area to determine, through calculation, the value of the ambiguity at a current time to be used as the initial value and/or the one value to be added for the continuous observation.

6. The positioning terminal according to claim 1, wherein the positioning terminal is configured to:
receive each value of the position of the positioning terminal as external information and record the each value in the storage area; and
acquire, when having newly started positioning, each value of the position of the positioning terminal, which is recorded in the storage area and acquired from the external information, to determine, through calculation, the value of the ambiguity at a current time to be used as the initial value and/or the one value to be added for the continuous observation.

7. The positioning terminal according to claim 1, wherein the positioning terminal is configured to:
receive each value of the position of the positioning terminal and time of the positioning terminal as external information and record the each value and the time in the storage area; and
calculate or acquire an amount of movement of the positioning terminal from the time, and use a value obtained by adding the movement amount to each value of the position of the positioning terminal, which is recorded in the storage area and acquired from the external information, to determine, through calculation, the value of the ambiguity at a current time to be used as the initial value and/or the one value to be added for the continuous observation.

8. The positioning terminal according to claim 1, wherein the positioning terminal is configured to:
  receive the value of the tropospheric propagation delay amount that is measured within a predetermined time period and/or a predetermined weather change level and within the area close to the position of the positioning terminal from the another device and record the received the value in the storage area; and
  use the value of the tropospheric propagation delay amount, which is recorded in the storage area as the value of the tropospheric propagation delay amount to be used as the initial value and/or the one value to be added for the continuous observation, to determine the value of the tropospheric propagation delay amount along with the value of the ambiguity.

9. A positioning method to be performed by a positioning terminal of a global navigation satellite system (GNSS), comprising:
  acquiring, by the positioning terminal, from a plurality of navigation satellites for the GNSS and an information source configured to output a precise ephemeris and correction information, a plurality of navigation signals, the precise ephemeris, and the correction information;
  acquiring, by the positioning terminal, in a process of causing each value of error including an ambiguity and a tropospheric propagation delay amount to converge through continuous observation, simultaneously with processing relating to a determination of the ambiguity, acquire and store to a storage area, a value of the tropospheric propagation delay amount that has been measured within an area close to a position of the positioning terminal from another device, and use the value of the tropospheric propagation delay amount as an initial value or one value to be added for the continuous observation, and simultaneously with processing relating to a determination of the tropospheric propagation delay amount, acquire each value of the position of the positioning terminal recorded in advance in the storage area and the value of the tropospheric propagation delay amount that has been measured within the area close to the position of the positioning terminal from the another device to calculate a value of the ambiguity, use the calculated value of the ambiguity as an initial value or one value to be added for the continuous observation, and then determine each value of the error to be used for correction, and execute the correction of the ranging observation data; and
  preforming, by the positioning terminal, precise point positioning (PPP) calculation by canceling an error component based on the ranging observation data corrected to calculate the position of the positioning terminal having the error components canceled.

10. A recording medium having a program non-transitorily recorded thereon,
  the program causing a processor included in a positioning terminal to operate so as to:
  acquire, in a process of causing each value of error including an ambiguity and a tropospheric propagation delay amount to converge through continuous observation to enhance an accuracy of precise point positioning (PPP);
  simultaneously with processing relating to a determination of the ambiguity, acquire and store to a storage area, a value of the tropospheric propagation delay amount that has been measured within an area close to a position of the positioning terminal from another device, and use the value of the tropospheric propagation delay amount as an initial value or one value to be added for the continuous observation; and
  simultaneously with processing relating to a determination of the tropospheric propagation delay amount, acquire each value of the position of the positioning terminal recorded in advance in the storage area and the value of the tropospheric propagation delay amount that has been measured within the area close to the position of the positioning terminal from the another device to calculate a value of the ambiguity, use the calculated value of the ambiguity as an initial value or one value to be added for the continuous observation, and then determine each value of the error cause to be used for correction, and execute the correction of the ranging observation data.

* * * * *